May 29, 1962  H. HANAU  3,036,365
METHOD OF MAKING BEARINGS
Filed April 22, 1959
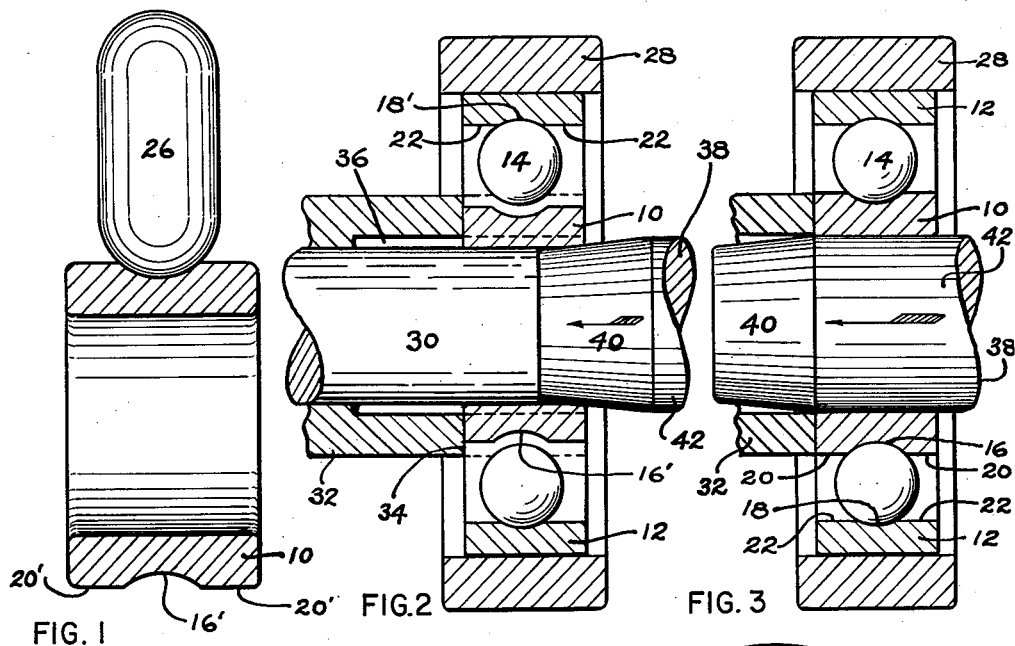
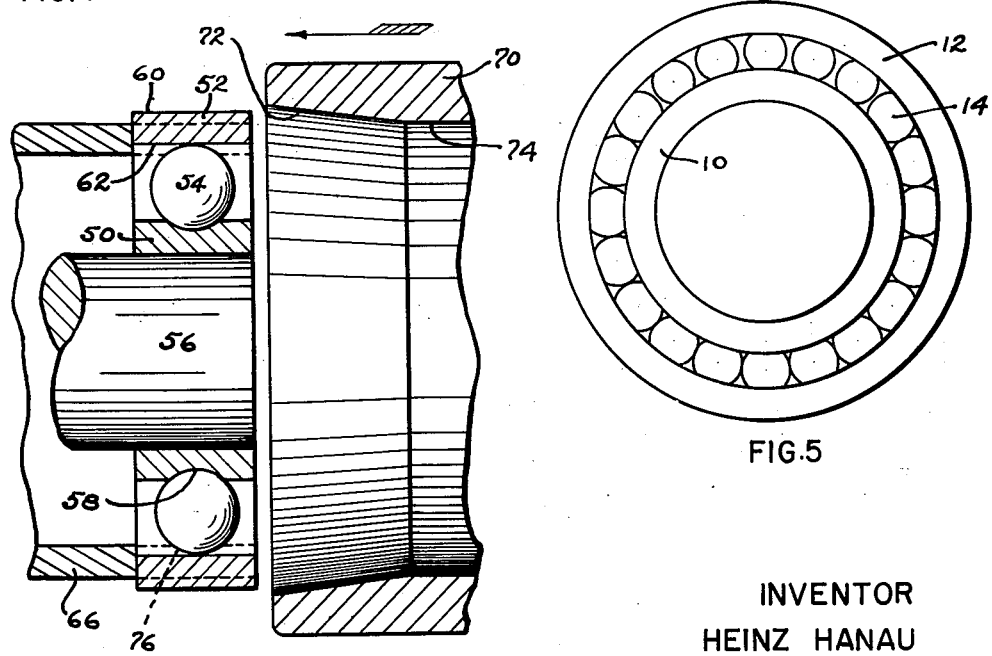
FIG.4
INVENTOR
HEINZ HANAU
BY  Edward H. Goodrich.
HIS ATTORNEY

United States Patent Office 3,036,365
Patented May 29, 1962

3,036,365
METHOD OF MAKING BEARINGS
Heinz Hanau, Hartford, Conn., assignor to General Motors Corporation, Detroit, Mich., a corporation of Delaware
Filed Apr. 22, 1959, Ser. No. 808,248
5 Claims. (Cl. 29—148.4)

This invention relates to an improved method of making bearings and particularly to a method for making full complement ball bearings.

Precision radial type ball bearings as previously manufactured have been expensive to make and often difficult to assemble. The raceways in the opposing race rings must be accurately ground to the required transverse curvatures and within very close tolerances. Furthermore, the balls which rollingly engage against the opposing raceways are usually circumferentially spaced and guided by suitable annular cages. The radial spacing of the opposing annular lands in these race rings at each side of the raceways in a radial type of bearing is necessarily much less than the diameter of the balls within the raceways. Consequently, during assembly, the race rings have to be radially displaced with relation to each other to enter the balls therebetween and only a limited number of balls can be inserted therein. When a larger complement of balls has been desired, it has been necessary to provide these race rings with loading grooves through which the balls could be individually and laterally entered into the raceways. However, these loading grooves materially reduce the strength of the bearings and often interfere with the movement of the balls causing bearing failure. Furthermore, the non-uniform stress distribution in a raceway where the balls move past the ends of the loading grooves, results in a weakened bearing structure which contributes to much shortened bearing life.

It is, therefore, an object of my invention to provide an improved ball bearing and a method for making the bearing wherein a full complement of balls may be employed without requiring any loading grooves in the race rings.

A further object of this invention is to provide an improved method for making an antifriction bearing which eliminates the need of grinding raceways for receiving the rolling elements.

A still further object of this invention is to provide an improved method of making an antifriction bearing wherein the rolling elements used in the bearing also serve to form the raceways therein.

A still further object of my invention is to provide an improved method of making a ball bearing wherein the raceways are formed by rolling operations and wherein the balls in the assembled bearing serve to at least partially form the raceways.

To these ends and also to improve generally upon methods of this character, this invention consists in the various matters hereinafter described and claimed. In its broader aspects, the invention is not necessarily limited to the specific structures and methods illustrated in the accompanying drawings wherein:

FIGURE 1 is a fragmentary cross sectional view diagrammatically showing the preforming of one of the raceways in my improved bearing;

FIGURE 2 is a fragmentary cross sectional view illustrating the method of radially deforming one of my race rings after the bearing parts have been assembled;

FIGURE 3 is a cross sectional fragmentary view showing my bearing at the completion of my race ring forming operation;

FIGURE 4 shows a method of making a bearing wherein the outer race ring is radially compacted during bearing manufacture; and FIGURE 5 shows an end view of the completed bearing.

My improved method for making antifriction bearings may be used on metals which may be flowed or deformed, as by various cold-working or rolling operations. I have found this method particularly applicable to certain cobalt-base alloys which become hardened during a cold-working operation. An example of one such alloy may comprise:

| | Percent |
|---|---|
| Cobalt | 50 |
| Chromium | 20 |
| Nickel | 9 to 11 |
| Tungsten | 14 to 16 |

Small amounts of iron, manganese and silicon.

My improved method is also applicable to forming antifriction bearings of certain ferrous base alloys.

In the antifriction bearing illustrated in FIGURES 1, 2, 3 and 5, there is provided an inner race ring 10, an outer race ring 12 and a substantially full complement of circumferentially arranged rolling elements as balls 14 for free rolling engagement against an annular inner raceway 16 and within an annular outer raceway 18. These raceways which are formed respectively in the inner and outer race rings, are of a size to assure coaxial race ring relation while the balls are in free raceway rolling engagement. The inner race ring has at each side of its raceway 16 an annular generally cylindrical land 20. The outer race ring 12 has at each side of its raceway 18 a similar annular cylindrical land 22. As is usual in ball bearing constructions, the radial distance between the opposed cylindrical lands 20 and 22 is very appreciably less than that of a ball diameter 14 so that the balls cannot be entered between these lands and into raceway rolling engagement while the race rings are located coaxially. It is my improved method of bearing manufacture which provides for the bearing construction wherein a substantially full complement of balls 14 may be located in rolling engagement with the opposed raceways without necessitating any cut-away portions or filling grooves in the race rings as has been required in previous full complement ball bearings.

In this invention, one of the race rings, herein illustrated as the inner race ring 10, is suitably mounted upon an arbor and rotated about its axis while a hardened steel roller 26 is radially forced inwardly against the race ring periphery to displace the metal of the ring and form a raceway 16' leaving at each side of this raceway a generally cylindrical land 20'. As illustrated, this roller 26 is larger in diameter and curvature than that of a rolling element 14. This initial metal working or rolling operation preferably is carried on to such an extent as to only partially finish the raceway 16' to its required radial depth and size. The transverse curvature of the roller 26 is chosen with a radius close to or the same as that of the balls 14 to be assembled in the final bearing. In a similar manner, the outer race ring is pressed within a confining annular holder 28 and rotated about its axis while a roller similar to the roller 26 forms a raceway 18 therein and between a pair of annular lands 22. This rolling operation may shape this outer raceway 18 to its required final size and form. However, I preferably initially roll-form this raceway as at 18' to a size which is slightly less than its required depth and transverse curvature.

The inner race ring 10 as shown in FIGURES 1 and 2, is initially made to a reduced diameter such that the balls 14 may be laterally inserted between the lands 20' and 22 and into loose raceway alignment while the race rings are supported in coaxial relation. I preferably provide the radial spacing between the coaxial lands 20' and 22 very slightly less than that of a ball diameter so that the balls may be snapped into raceway position between these lands and will thereafter be prevented from falling out of the raceways. This spacing between these lands 20' and 22 may be as little as a fraction of one thousandth of an inch less than the ball diameters.

As shown in FIGURE 2, during the manufacture of my ball bearings, the inner race ring 10 is slidably mounted over the end of a retractable arbor 30 which is located coaxial with the bore through the annular holder 28 which temporarily supports the outer race ring 12. An abutment collar 32 slidably mounted over the arbor 30 has an end face 34 positioned to abut against the end of the inner race ring 10 to locate its raceway 16' radially aligned with the outer raceway in the outer race ring 12. The collar 32 is also provided with a counterbore 36 having a diameter at least as great as that of the bore through the inner race ring 10 when the bearing is completed. If desired, the full complement of balls 14 may be snapped into their loose raceway alignment with the bearing parts temporarily assembled as shown in FIGURE 2. An expansion arbor 38 has a tapering end portion 40 inserted in the bore of the inner race ring 10 and terminates in a cylindrical portion 42.

As shown in FIGURES 2 and 3, the tapering end of the expansion arbor 38 is forced into and through the bore of the inner race ring until the cylindrical portion 42 extends completely through the race ring 10. At this time, the advance of the expansion arbor pushes the supporting arbor 30 slidably through the locating collar 32 and out of the race ring while the fixed collar 32 maintains the inner ring 10 in radial raceway alignment with the outer raceway. The counterbore receives the end of the cylindrical portion 42 of the expansion arbor. This expansion operation radially stretches the inner race ring 10 to the dotted-line indicated position of FIGURE 2 and to the full-line position of FIGURE 3. During this radial expansion of the inner race ring, there is provided a relative rotation between the race rings through their various supporting members. Preferably, the holder 28 and race ring 12 may be rotated. However, the inner ring 10 and its supporting members may be rotated or even both race rings may be rotated at different rates of speed. The diameter of the cylindrical portion 42 is preferably such that the radial expansion of the ring 10 will press the rotating hardened balls 14 tightly against the opposing annular raceways to cause a further cold-flow of the metal in the inner race ring and to locate the balls in transverse mating engagement with both raceways, thus providing a free antifrictional race ring rotation without loose radial play between the race rings. If the outer raceway has been only partially formed to its required size and depth, this ball rolling operation will further and finally form both raceways from their initial form at 16' and 18' to their final size and shape at 16 and 18 wherein the balls 14 will precisely fit both raceways. It will be appreciated that this final forming of the raceways during a relative raceway rotation, and by the very rolling elements which form a part of the bearing itself, will produce an extremely accurate ball bearing which avoids the accumulative errors that are often present when separately ground bearing parts are assembled. In view of the fact that there is some resilience in the metal of the race ring 10 during its cold-flow expansion, the diameter of the cylindrical portion 42 is preselected to control the fit of the balls against the opposing raceways. Hence, the diameter of the portion 42 is initially chosen to provide a required radial preload of the raceways against the balls or, if desired, to eliminate the preload while still providing the precise fit of the balls and raceways. Upon completion of this forming operation, the expansion arbor 38 is withdrawn from the inner race ring and the outer race ring is removed from the annular holding member 28 and the bearing is ready for service.

If desired, the initial roll forming operation of the raceways, as exemplified in FIGURE 1, may be extended sufficiently to completely form each raceway to its final required size and contour and the subsequent radial expansion of the inner race ring 10 with the arbor 38 may be made just sufficient to bring the balls into the desired rolling engagement with both raceways. However, it has been found that in the bearings developed in accordance with my method that it is preferable to only partially form the raceways during the initial rolling operations and to complete this raceway forming operation with the actual hardened rolling elements as the balls 14 which are used in the final bearing.

In the embodiment of FIGURE 4, there is provided a ball bearing having an inner race ring 50, an outer race ring 52 and an intervening circumferentially arranged complement of balls 54. The inner race ring 50, which is mounted on an arbor 56 during bearing manufacture, has a raceway 58 that is preferably partially preformed by a rolling operation as described with reference to the race ring 10 in FIGURE 1. The outer race ring 52 is initially formed as a sleeve having a cylindrical outer wall 60 and a cylindrical inner wall 62. This cylindrical inner wall 62 is of such diameter that it may be axially slid over a full complement of circumferentially arranged balls 54 fitted against the inner raceway 58 as shown in FIGURE 4. An abutment collar 66 is positioned against the end of the race ring 52 during manufacture to prevent endwise movement of this race ring while a reducing collar 70 is axially forced over the periphery 60 of the outer race ring 52. The collar 70 has a flared tapering throat 72 which reduces at its inner end to a cylindrical bore 74. As the collar 70 is forced endwise in the direction of the arrow over the outer race ring, the outer race ring is radially and uniformly shrunk to the dot-indicated position and the metal of this race ring flows to form an outer ball-receiving raceway 76 and to complete the formation of the raceway 58. As in the previously explained method, a relative rotation is provided between the race rings during this race-forming operation by providing the desired rotation of the various race ring supporting members.

My invention not only provides a simple and inexpensive method of making an antifriction bearing, but it also provides a method of eliminating the previously objectionable loading grooves which were detrimental to the strength of the bearing and which often contributed to short bearing life. Furthermore, by providing a full complement bearing, the load-carrying capacity of the bearing is much greater than that of bearings of comparable size wherein a lesser number of balls are employed and separated by a cage or separator. Additionally, when such a bearing is made of a cobalt alloy, the cold flow of the metal occasioned by the rolling elements 26 and the balls 14 and/or 54 produces a work hardening effect with a resultant bearing that is highly wear-resistant and long-lived as well as being corrosive-resistant and capable of withstanding high temperatures. My invention is also applicable to the manufacture of ball bearings having deep raceways and wherein the balls are separated by a single-piece annular separator. In this last mentioned construction, the balls are initially located in circumferentially spaced relation in the separator and then assembled with one of the race rings after which the other race ring is radially expanded or contracted to required size during a relative race ring rotation as previously described.

I claim.

1. The method of making an antifriction bearing having a pair of radially spaced race rings interposed by a circumferential series of rolling elements, comprising the steps of forming said race rings from tough ductile metal which increases in hardness when subjected to cold-working deformation, rolling an annular raceway in each race ring with a roller whose raceway-engaging radius exceeds that of said rolling elements to form a raceway therein of less than the required final depth, one of said rolling operations being performed with a roller of larger curvature than that of said rolling elements, laterally inserting the rolling elements with a snap fit between the race rings and positioning said elements in loosely received relation within both raceways, coaxially locating the race rings and rotating one of said rings with respect to the other, and uniformly changing the diameter of one of the rings radially towards the other ring during said ring rotation to reduce the radial spacing between the rings causing the rolling elements to further roll-form the bottom portions of both raceways.

2. The method of making an antifriction bearing having a pair of radially spaced race rings with a circumferential series of rolling elements therebetween, comprising the steps of forming said rings from a ductile cobalt-containing alloy which increases considerably in hardness when subjected to cold-working deformation, cold-rolling an annular raceway in one of said rings with a roller whose raceway engaging radius exceeds that of said rolling elements, cold-rolling an annular raceway in the other race ring with a roller whose curvature exceeds that of said rolling elements, laterally inserting the rolling elements with a snap fit between the race rings and positioning said rolling elements in loosely received relation within both raceways, coaxially locating the race rings, imparting a relative rotation to said rings, and uniformly changing the diameter of one of the race rings through a cold-working operation radially towards the other ring during said relative ring rotation to reduce the radial spacing between the rings and locate the rolling elements in predetermined preloaded interfitting relation with both raceways.

3. The method of making an antifriction bearing having a pair of radially spaced race rings interposed by a circumferential series of rolling elements, comprising the steps of forming said rings from a ductile alloy which increases in hardness when subjected to cold-working deformation, cold-rolling an annular raceway in each race ring with a roller of larger curvature than that of said rolling elements, laterally inserting the rolling elements with a snap fit between the race rings into loosely received relation between both raceways, coaxially locating the race rings, imparting a relative rotation to said rings, and uniformly changing the diameter of one of the rings radially towards said other ring through a cold-working radial deformation which reduces the spacing between said rings, said deformation being continued during said relative rotation sufficiently to further form only the bottom portions of the raceways with said rolling elements.

4. The method of making an antifriction bearing having a pair of radially spaced race rings interposed by a circumferential series of balls therebetween, comprising the steps of forming said race rings from a ductile alloy which increases in hardness when subjected to cold-working deformation, cold-rolling an annular raceway in one of said rings with a roller having a raceway-engaging curvature which exceeds that of said balls, cold-rolling an annular raceway in the other race ring, laterally inserting the balls with a snap fit between the race rings into loosely received relation within both raceways, coaxially locating the race rings, rotating one race ring with respect to the other, and uniformly changing the diameter of one of said race rings radially towards the other ring to reduce the spacing between the rings and locate said balls in predetermined preloaded interfitting engagement with the bottom portions of both raceways.

5. The method of making an antifriction bearing having a pair of radially spaced race rings interposed by a circumferential series of balls, comprising the steps of forming said race rings from a ductile cobalt-containing alloy which increases in hardness when subjected to cold-working deformation, cold-rolling an annular raceway in each race ring with a roller of larger diameter than and having a greater radius than that of said balls, laterally inserting the balls with a snap fit between the race rings into loosely fitting relation within both raceways, coaxially locating the race rings, imparting a relative rotation to said rings, and uniformly changing the diameter of one of the rings through a cold-working radial deformation radially towards the other ring, said radial deformation bringing the raceways into interfitting contact with the balls and continuing sufficiently to cause the balls to further roll-form only the bottom portions of each of said raceways.

References Cited in the file of this patent

UNITED STATES PATENTS

| | | |
|---|---|---|
| 1,080,169 | Reed | Dec. 2, 1913 |
| 2,185,483 | Ward | Jan. 2, 1940 |
| 2,223,799 | Annen | Dec. 3, 1940 |
| 2,719,765 | Menne | Oct. 4, 1955 |
| 2,783,528 | Menne | Mar. 5, 1957 |

FOREIGN PATENTS

| | | |
|---|---|---|
| 552,180 | Great Britain | Mar. 5, 1943 |